(12) United States Patent
Kidder

(10) Patent No.: X9321
(45) Date of Patent: Jan. 15, 1836

(54) WELLS, COVERS OF

(76) Inventor: Levi Kidder

Levi Kidder

Letters Patent

The Schedule referred to in these Letters Patent and making part
of the same containing a description in the words of the said Levi
Kidder himself of his improvement on the application of hy-
draulic cement to securing wells.

The invention which he calls the well secure is formed in four
parts, which for the sake of description he calls, 1st The wall
which is circular and of any desired dimensions required for strength
and for being built any height after, and as it were a contin-
uation of the stone wall already raised to certain height and in
the ordinary way. 2d The arch with a circular aperture or other
shape in the centre large enough to admit a pump, and a person
to pass through by its side, the arch rests upon the top of the
wall. 3d The neck which is about four inches thick, eigh-
teen inches high and of the same diameter as the aperture above men-
tioned, around which resting on the arch it is erected
4th The cover which is an arch or dome in two parts, with an
aperture in the centre of the same size as the pump to which
it is made exactly to fit. The cover rests upon the neck. The
first three parts are fixed and united forming one mass. The
last is separate and moveable. They are thus constructed. The
well being walled with stone in the ordinary way to any desired
height say within five feet of the surface of the ground or if the
well has been previously walled to the surface of the ground
(the wall should be removed to the required depth) and the top
of said wall being level upon it all around is set a common
the circular mould in form of a cask two and one half feet
high. The workman then standing inside on a stage thrown
across the well for that purpose, reaches over the mould and
with a trowel commences the cement wall upon the top of the
stone one. by laying upon the exterior [at the bottom all around] of the mould, a tall a layer of cement mortar first prepared for his use, thus forming
the first section of the wall about four inches thick and five inch
es high or of other dimensions if requisite or convenient,
which done the earth is shovelled in and firmly pounded,
filling the space between this section of the wall and the sides of
the well pit. In the same way is moulded another section of
the wall uniting with the first, and the earth as before thrown
in and packed. In this manner the operation is continued un
til the wall is raised to the top of the mould when it is com-
plete. The pump if not before should now be introduced and
fixed perpendicular in the centre after which the mould should
be removed and a stage supported by props resting on the
first mentioned stage should be thrown across the well, around
the pump within about two inches of the top of the cement
wall, on this stage a mound of earth is erected and firm
ly packed in the form of an arch or dome, with an elevation
in the centre around the pump of about eighteen inches
above the top, and within the interior circumference of the
cement wall. This earthen dome forms the mould for the
second part the arch. On the top of this mould is placed cen
trally in a horizontal position around the pump a ring of sheet
iron or other material, about twenty two inches wide and ~~twen~~-
twenty four ~~inches~~ in diameter, made removable. This ring forms
the aperture into the well, and at the same time the inside mou
for the third part or neck which may be of any other shape if
desired. Said ring being fixed the second part or arch is cast
upon the mould about four inches thick or thicker if required
and extending from the exterior of the ring all over the mould
and to the exterior of the wall, upon the top of which when
the mould is removed it will rest. Another similar ring is
now placed horizontally upon the arch outside of the first
ring and parallel with it at the distance of three or four inch
es. These rings so placed form the mould in which is cas the neck of which they determine the dimensions. The neck is cast by filling the space between the rings with the cement mortar uniting with the arch just formed. They are made the first three parts which are now united in one mass. To form the cover fill up the space around the pump between it and the first mentioned ring with earth which raise in the form of an arch or dome elevated about six inches above the top of the neck. this constitutes the mould for the cover. Now lay upon the top of the neck a covering of thick rapping paper or other material to form a separation between the neck and cover. and in order to have the cover in two parts insert perpendicularly in the mould on opposite sides of the pump two strips or pieces of sheet iron extending from the pump to the exterior of the neck with their upper edges arched and as much above the mould say three inches as the thickness of the cover is to be. This done cast the cover extending from the pump to which it is moulded to the exterior of the neck upon which it is to fit and rest inserting as you advance at proper places suitable metallic fastenings and handles for the purpose of fastening or removing the cover at pleasure.

The <u>well Secure</u> is now formed and time being allowed for the cement sufficiently to set or harden; the earth may be thrown in upon the arch and against the neck level with the surface of the surrounding ground. The cover which with about six inches of the neck is above the ground may now be taken off and the moulds and the stages from the inside removed; after which replace and fasten the cover and you have completed the well secure, a perfect defence against the influx of water and the depredations of vermin The principle of this improvement consists in the construction in hydraulic cement of a protecting cover and sides to wells cisterns reservoirs, and other vessels in the earth whereby the water within them will be secured against the influx of surface water and the intrusion of vermin in the mode and by the means substantially as above described Witnesses
H.G.C. G R J Bowdoin
James Bowdoin Levi Hidden